United States Patent
Romem et al.

(10) Patent No.: US 11,323,393 B2
(45) Date of Patent: May 3, 2022

(54) SYSTEM AND METHOD FOR IMPROVING NETWORK STORAGE ACCESSIBILITY

(71) Applicant: Nvidia Corporation, Santa Clara, CA (US)

(72) Inventors: Yaniv Romem, Jerusalem (IL); Omri Mann, Jerusalem (IL); Ofer Oshri, Kfar Saba (IL); Kirill Shoikhet, Raanana (IL)

(73) Assignee: NVIDIA CORPORATION, Santa Clara, CA (US)

( * ) Notice: Subject to any disclaimer, the term of this patent is extended or adjusted under 35 U.S.C. 154(b) by 400 days.

(21) Appl. No.: 16/257,929

(22) Filed: Jan. 25, 2019

(65) Prior Publication Data

US 2019/0230053 A1 Jul. 25, 2019

Related U.S. Application Data

(60) Provisional application No. 62/621,678, filed on Jan. 25, 2018.

(51) Int. Cl.
| | |
|---|---|
| *H04L 49/9005* | (2022.01) |
| *H04L 47/11* | (2022.01) |
| *H04L 47/12* | (2022.01) |
| *H04L 47/32* | (2022.01) |
| *H04L 47/50* | (2022.01) |
| *H04L 67/1097* | (2022.01) |

(52) U.S. Cl.
CPC .......... *H04L 49/9005* (2013.01); *H04L 47/11* (2013.01); *H04L 47/12* (2013.01); *H04L 67/1097* (2013.01); *H04L 47/32* (2013.01); *H04L 47/50* (2013.01)

(58) Field of Classification Search
CPC ........................ H04L 43/16; H04L 47/00–829
See application file for complete search history.

(56) References Cited

U.S. PATENT DOCUMENTS

| | | | | |
|---|---|---|---|---|
| 6,308,238 | B1* | 10/2001 | Smith | ................ H04L 47/10 709/203 |
| 6,801,927 | B1* | 10/2004 | Smith | ................ H04L 47/10 709/202 |
| 8,176,245 | B2 | 5/2012 | Huang et al. | |
| 9,247,313 | B1* | 1/2016 | Lewis | ............. H04N 21/26216 |
| 9,402,601 | B1* | 8/2016 | Berger | ................ A61B 8/4472 |
| 10,067,959 | B1* | 9/2018 | Animesh | ............. G06F 16/245 |
| 10,389,657 | B1* | 8/2019 | Scherpbier | ............. H04L 49/90 |
| 2004/0044846 | A1* | 3/2004 | Matthews | ............. G06F 3/0613 711/113 |
| 2010/0020705 | A1* | 1/2010 | Umeda | ................ H04L 43/10 370/252 |

(Continued)

*Primary Examiner* — David R Lazaro
*Assistant Examiner* — Julian Chang
(74) *Attorney, Agent, or Firm* — Kligler & Associates Patent Attorneys Ltd

(57) ABSTRACT

A system and method for improving network storage accessibility, the method including: sending at least a first request for a data block to be sent from a storage device to a client device over a network connection; determining if the network is congested; initiating a client-specific buffer when it is determined that the network is congested, wherein the requested data block is stored in the client-specific buffer; and sending at least a second request for the data block stored within the client-specific buffer to be sent to the client device.

19 Claims, 4 Drawing Sheets

(56) References Cited

U.S. PATENT DOCUMENTS

2010/0180045 A1* 7/2010 Weinstock ............ H04L 47/745
                                                    709/232
2016/0234118 A1* 8/2016 Picon Cabezudo ..... H04L 47/11
2016/0366202 A1* 12/2016 Phillips ............ H04N 21/26258

* cited by examiner

SYSTEM AND METHOD FOR IMPROVING NETWORK STORAGE ACCESSIBILITY

CROSS-REFERENCE TO RELATED APPLICATIONS

This application claims the benefit of U.S. Provisional Application No. 62/621,678 filed on Jan. 25, 2018, the contents of which are hereby incorporated by reference.

TECHNICAL FIELD

The present disclosure relates generally to network throttling and particularly to improving network storage accessibility in asymmetrical network topologies.

BACKGROUND

Network traffic often includes client devices requesting data from storage servers over a network. For example, a client device may request to stream a movie, access a file in a cloud-based computing system, download a picture, and similar requests. Each such transaction includes a client device sending a request, a server receiving the request, and the server sending the client device the requested data from a stored location. By the nature of this type of communication, the client device requests require less bits than the requested data itself. A request for a movie may be only a few hundred or thousand bits used to identify the desired file, while chunks of the movie itself which correspond to the request may be two, three, or more orders of magnitude larger.

Client devices typically do not communicate directly with storage devices, but rather, e.g., through an intermediary, such as a network switch. While the client device can send hundreds of requests within a short period of time, and the switch can handle sending these requests to the storage server, sending the requested data back, i.e., the responses to the client, at a rate proportional to what the client device can receive is often not practical, if not impossible. This imbalance may cause network congestion on the switch. The switch may then drop data sent from the storage server to the client device and may signal to the storage server to stop sending any data until the client device has finished handling the current requests or until it has queue space. Repeated rejection notifications may further encumber the network, and in some cases cause a less optimal experience for a user of the client device.

One means for preventing networking congestion is to limit the number of requests sent by the client to the storage. However, this can lead to low network utilization when storage latency is higher or inconsistent when compared to network latency.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for improving network storage accessibility, the method including: sending at least a first request for a data block to be sent from a storage device to a client device over a network connection; determining if the network is congested; initiating a client-specific buffer when it is determined that the network is congested, wherein the requested data block is stored in the client-specific buffer; and sending at least a second request for the data block stored within the client-specific buffer to be sent to the client device.

Certain embodiments disclosed herein also include a non-transitory computer readable medium having stored thereon instructions for causing a processing circuitry to perform a process, the process including: sending at least a first request for a data block to be sent from a storage device to a client device over a network connection; determining if the network is congested; initiating a client-specific buffer when it is determined that the network is congested, wherein the requested data block is stored in the client-specific buffer; and sending at least a second request for the data block stored within the client-specific buffer to be sent to the client device.

Certain embodiments disclosed herein also include a system for improving network storage accessibility, including: a processing circuitry; and a memory, the memory containing instructions that, when executed by the processing circuitry, configure the system to: send at least a first request for a data block to be sent from a storage device to a client device over a network connection; determine if the network is congested; initiate a client-specific buffer when it is determined that the network is congested, wherein the requested data block is stored in the client-specific buffer; and send at least a second request for the data block stored within the client-specific buffer to be sent to the client device.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
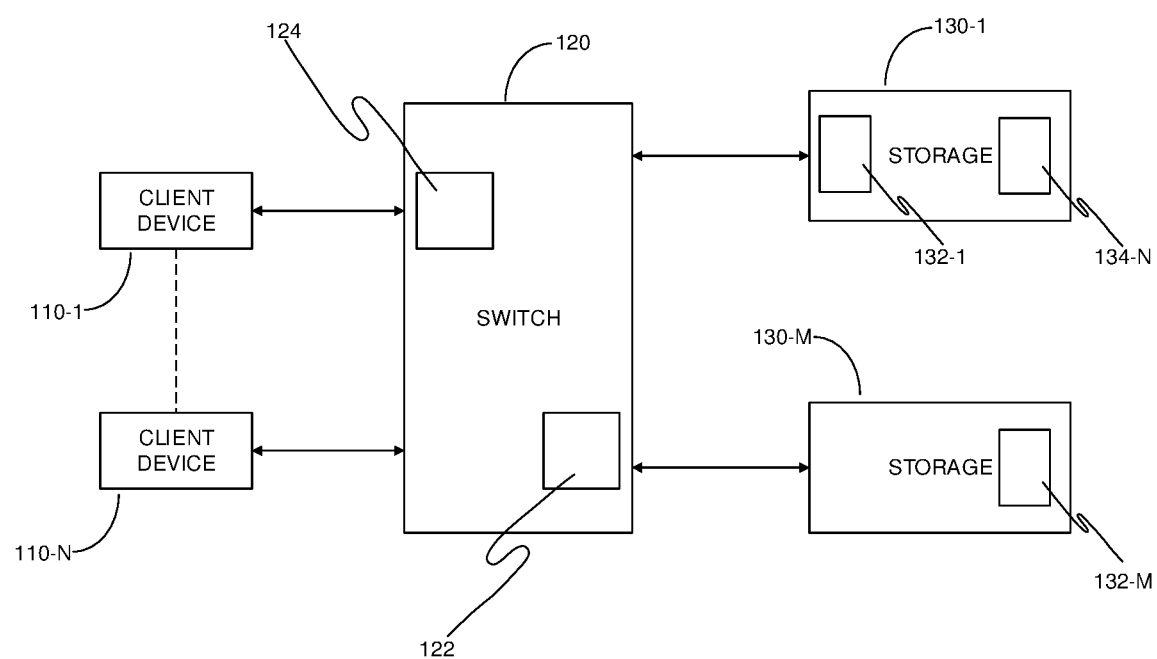
FIG. 1 is a schematic diagram of a network throttling scheme utilized to describe the various embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example schematic diagram 100 of a network throttling scheme. In an embodiment illustrated in FIG. 1, client devices 110-1 through 110-N, where N is an integer equal to or greater than 1 (referred to herein as client device 110 or client 110 for simplicity) are communicatively coupled with a switch 120, e.g., over a network, to at least one network accessible storage devices 130-1 through 130-M, where M is an integer equal to or greater than 1 (referred to herein as storage device 130 or storage 130 for simplicity).

A client device 110 may request data from a storage device 130 by sending, for example, a request to read a data block from a storage 130. The request may include an identifier of the storage 130, an address of the data block, a size of the data block, and similar metadata. A request for a data block is typically one or more orders of magnitude smaller in bit size than the data itself. Thus, communication between the client device 110 and storage 130 is referred to as creating asymmetrical network traffic due to the difference in bandwidth consumption between the upstream (client to storage) and the downstream (storage to client).

In certain cases, a client device 110 may request a plurality of data blocks by sending a plurality of requests to the storage 130. The requests and responses are typically sent through intermediary systems, such as network switches (such as switch 120). In some embodiments, the switches include data buffers for incoming (egress) and outgoing (ingress) data packets, where each data buffer is served by a unique network interface.

In an embodiment, a switch 120, connected between the client device 110 and storage devices, includes an egress memory buffer 122 and an ingress memory buffer 124. When the egress memory buffer on an interface is full, the ingress memory buffer 124 will also begin to fill. When the ingress memory buffer is full there is network congestion, and the switch may be configured to send the target device, e.g., the client device 110 or storage device 130, a notification to temporarily stop sending requests for data or responses, until such time as there is sufficient ingress buffer space 124, or drop packets to free buffer space for other packets that may have a different destination.

To avoid network congestion, the client device 110 needs to know the size of the egress buffer, for example, and limit the total amount of potential response data to be less than this size. However, such a limitation may lead to underutilization. Typically storage devices can handle many requests in parallel to compensate for their longer response times. Limiting the number of requests to a constraint of the egress buffer (i.e., the buffer size) may lead to significant loss of efficiency, especially in terms of response bandwidth.

As an alternative approach, each client device 110 is supplied with a client specific buffer. This buffer may reside in the storage device 130, a memory associated with the storage device 130, or a combination thereof. The client-specific buffer may be, in an embodiment, larger than the egress buffer and assigned per storage device 130. In an embodiment illustrated in FIG. 1, a client device 110-1 is associated with a client-specific buffer 132-1 of storage device 130-1, and client specific buffer 132-M of storage device 130-M. The storage device 130-1 further includes a client specific buffer 134-N associated with client device 110-N.

A client specific buffer 132 may be initiated by the client device 110, by a storage server (not shown) containing therein one or more storage devices, by the storage device 130, by the switch 120, or any combination thereof. When a client device 110 sends a request for a data block, the request may be a request to retain the data in the client specific buffer 132 and, in an embodiment, send a response to indicate that the data is accessible. If it is, the storage 130 will read the data block to the client specific buffer 132, which may be initiated in response to receiving the request for data. After receiving the response, the client device 110 can send a subsequent request to retrieve the data from the client specific buffer 132. Upon receiving this request, the storage device 130 sends the data block from the client specific buffer 132 via the egress buffer 122, to be delivered by the switch 120 to the client device 110.

The client device 110 may continue to send requests for data, which may be stored in a queue (not shown) of the client specific buffer 132. Thus, rather than attempt to continuously send the switch 120 data (which cannot be delivered due to the buffer size and number of requests), the storage device 130 effectively throttles the requests for data by storing the requests within the client specific buffer 132, and only supplying the data when the client device 110 has determined that the switch is capable of delivering the data to the client device 110.

With this scheme, the client device 110 may limit the number of outstanding requests for network transmission, e.g., requests for data blocks, either from a storage 130 directly or from client specific buffers 132, to avoid network congestion. The client device 110 may also determine that the network is congested, for example, by recording and measuring a growth in network response times as exceeding a predetermined threshold, to further throttle the number of outstanding requests. The client device 110 may issue a larger number of outstanding requests to the storage device 130 to maximize their utility with some or all responses stored in a client specific buffer 132. Overall, this implementation of the client specific buffer 132 may improve network congestion while maintaining a high utility of the storage devices.

Figure 2:
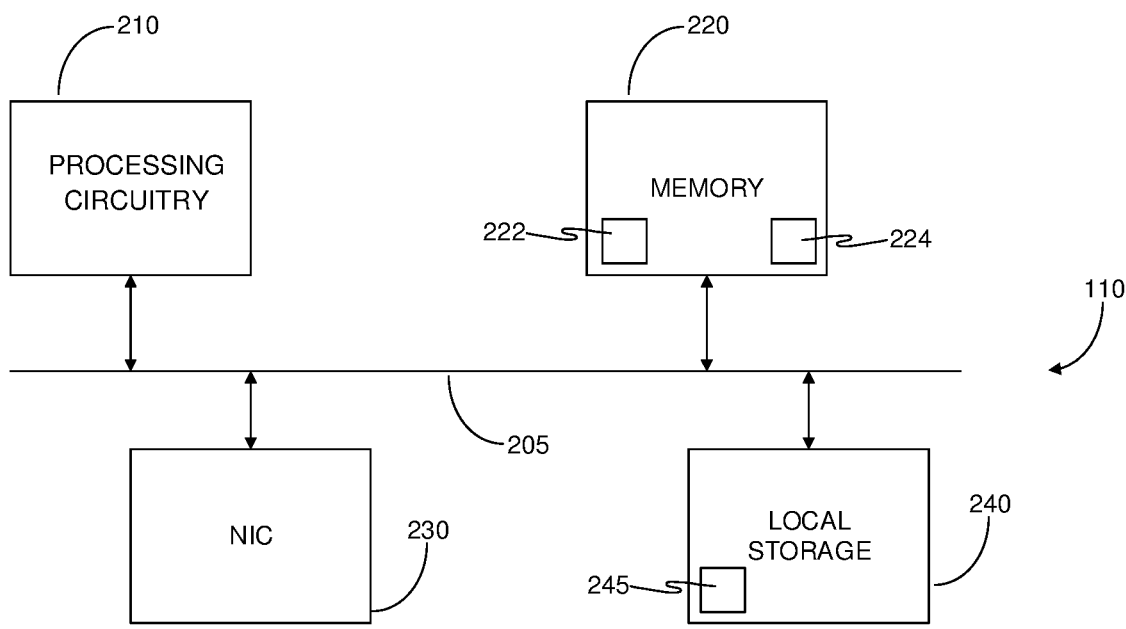
FIG. 2 is a schematic diagram of a client device structured according to an embodiment.

FIG. 2 is an example schematic diagram of a client device 110 structured according to an embodiment. The client device 110 includes at least one processing circuitry 210, for example, a central processing unit (CPU). In an embodiment, the processing circuitry 210 may be, or be a component of, a larger processing unit implemented with one or more processors. The processing circuitry 210 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The processing circuitry 210 is coupled via a bus 205 to a memory 220. The memory 220 may include a memory portion 222 that contains instructions that, when executed by the processing circuitry 210, performs the method described in more detail herein. The memory 220 may be further used as a working scratch pad for the processing circuitry 210, a temporary storage, and others, as the case may be. The memory 220 may be a volatile memory such as, but not limited to random access memory (RAM), or non-volatile memory (NVM), such as, but not limited to, flash memory.

The memory 220 may further include a memory portion 224 containing requests for data to be sent to a network accessible storage device. A request may include an identifier of the storage, e.g., the storage 130 of FIG. 1, such as a MAC address, an IP address, a name, combinations thereof and the like, an address of a data block to be read and retrieved, and other relevant metadata. The processing circuitry 210 may be coupled to a network interface controller (NIC) 230. In some embodiments, the NIC may have remote direct memory access (RDMA) capabilities. The NIC 230 is operative for allowing the client device 110 to connect to a network.

The network may include various intermediary devices which provide connectivity between the client device and the network accessible storage device, such as switches, proxy servers, etc. In an embodiment, the network may be configured to provide connectivity of various sorts, as may be necessary, including but not limited to, wired and/or wireless connectivity, including, for example, local area network (LAN), wide area network (WAN), metro area network (MAN), worldwide web (WWW), Internet, and any combination thereof, as well as cellular connectivity.

The processing circuitry 210 may be further connected to a local storage 240. The local storage 240 may include storage portion 245 containing data blocks received from a network accessible storage device 130. The processing circuitry 210 or the memory 220 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 210 to perform the various functions described in further detail herein.

Figure 3:
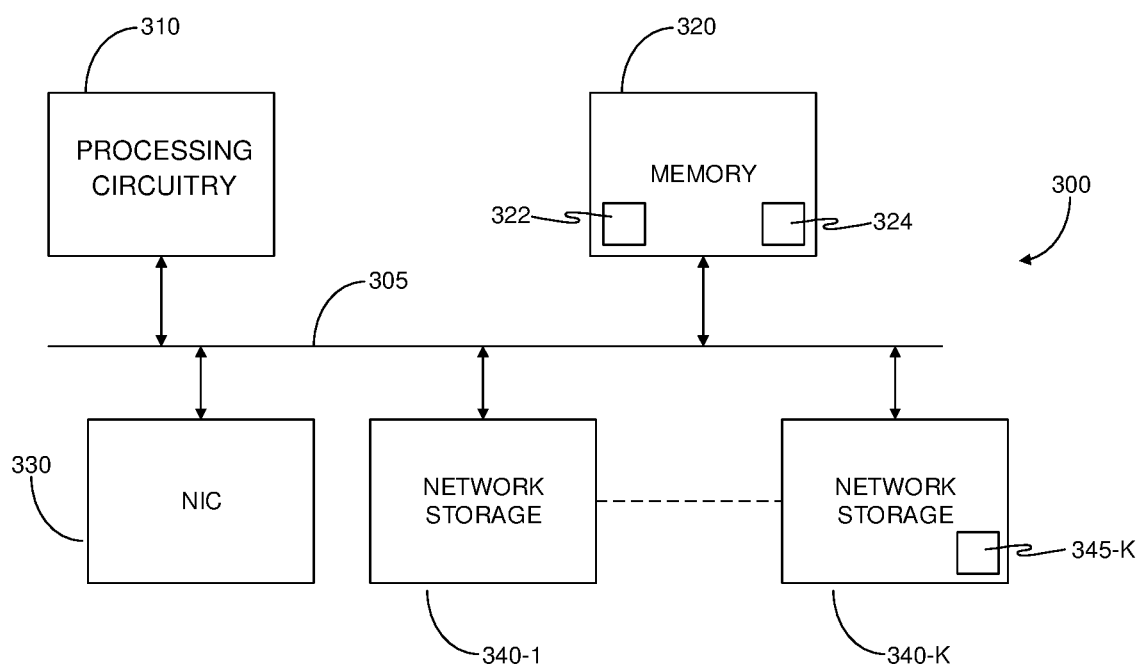
FIG. 3 is a schematic diagram of a storage server structured according to an embodiment.

FIG. 3 is a schematic diagram of a storage server 300 according to an embodiment. The storage server 300 includes at least one processing circuitry 310, for example, a central processing unit (CPU). In an embodiment, the processing circuitry 310 may be, or be a component of, a larger processing unit implemented with one or more processors. The processing circuitry 310 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The processing circuitry 310 is coupled via a bus 305 to a memory 320. The memory 320 may include a memory portion 322 that contains instructions that, when executed by the processing circuitry 310, performs the method described in more detail herein. The memory 320 may be further used as a working scratch pad for the processing circuitry 310, a temporary storage, and others, as the case may be. The memory 320 may be a volatile memory such as, but not limited to random access memory (RAM), or non-volatile memory (NVM), such as, but not limited to, flash memory.

The memory 320 may further include memory portion 324 containing a queue of requests for data to be read from a network accessible storage device and sent to a client device. The queue may be associated with a client specific buffer (as described in more detail herein) which is stored physically on the memory 320 or on a storage device. For this type of application, the distinction between a memory and a storage device is defined by access speeds (memory is faster than storage), price (storage is cheaper than memory) and availability (typically storage is larger than memory). However, certain recent advancements may negate these distinctions as technology converges to provide high access speed memory at affordable prices. Therefore, the client specific buffer, and associated queue, may be implemented on the memory, storage, a combination thereof, and the like, all without departing from the scope of this disclosure.

The queue may temporary hold or maintain one or more requests from one or more client devices, each request including, for example, an identifier of the storage, e.g., the storage 130 of FIG. 1, such as a MAC address, an IP address, a name, combinations thereof and the like, an address of a data block to be read and retrieved, and other relevant metadata. The processing circuitry 310 may be coupled to a network interface controller (NIC) 330. In some embodiments, the NIC 330 may have RDMA capabilities. The NIC 330 is operative for allowing the storage server 300 to connect to a network (not show) to provide connectivity between the storage server 300 and client devices. The connectivity is achieved via switches, proxy servers, and the like. In an embodiment, the network may be configured to provide connectivity of various sorts, as may be necessary, including but not limited to, wired and/or wireless connectivity, including, for example, a LAN, a WAN, a MAN, worldwide web (WWW), Internet, and any combination thereof, as well as cellular connectivity.

The processing circuitry 310 may be further coupled with a plurality of network storage devices 340-1 through 340-K, generally referred to as network storage (or network storage device) 340, where K is an integer equal to or greater than 1. The network storage 340 may be used for the purpose of storing a copy of the method executed in accordance with the disclosed technique. A network storage 340 may include a storage portion, such as storage portion 345-K of network storage 340-K containing a queue of requests for data blocks of the storage, data blocks read from the storage ready to send to a requesting client device, and the like. The storage portion may be realized as a solid state drive, an optical drive, a hard disk, flash drive, and the like.

The processing circuitry 310 or the memory 320 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in further detail herein.

Figure 4:
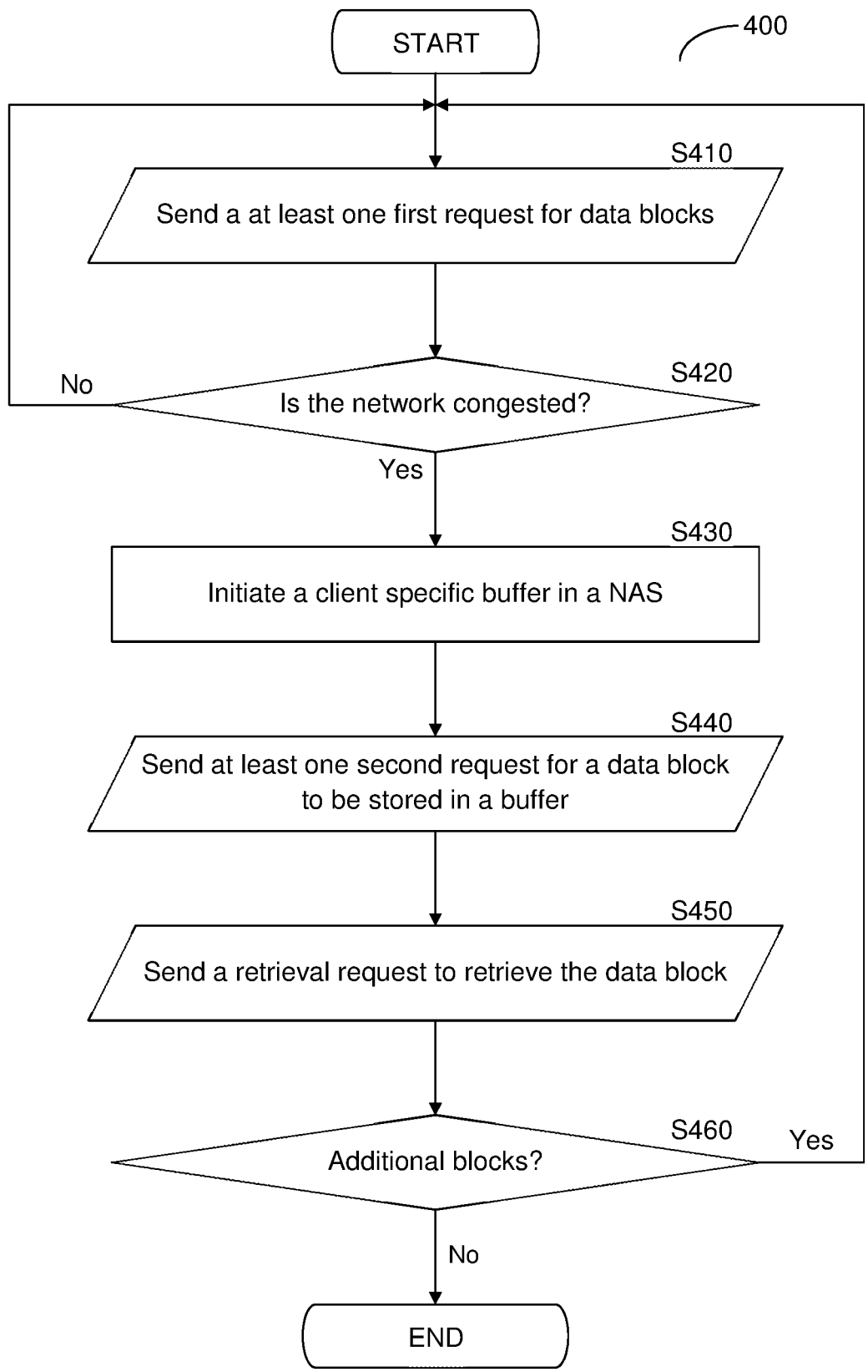
FIG. 4 is a flowchart of a method for throttling access to network accessible storage devices to improve network traffic flow according to some embodiments.

FIG. 4 is an example flowchart 400 of a method for throttling access to network accessible storage devices to improve network traffic flow according to some embodiments.

At S410, at least one first request is sent, e.g., by a client device, to receive data blocks from a network accessible storage (NAS) device, such as storage 130 of FIG. 1. Each of the at least one first request may be directed to providing one or more data blocks. A request may include an identifier of the storage device, an identifier of the client device, an address of the data block, and other relevant metadata. A request may be sent, for example, as a data packet.

At S420, it is determined if a network connecting the client device and the NAS device is congested. The determination may be based on a received response to the first request. If a notification to temporarily stop sending requests for data has been sent, it may be determined that the network is congested. In an example embodiment, a number of outstanding requests and network bandwidth is determined, and a probability based on this data to determine if the network is congested is computed. If the network is determined to be congested, execution continues at S430, otherwise execution continues at S410.

In some embodiments, a rate at which data packets are received, e.g., by a switch, is determined. For example, the client device or storage server may monitor instances when the client device received a denial from the switch, and determine from these a rate at which the storage device can send data blocks, with a statistical expectation that a percentage of those blocks will pass through the switch without being denied. The percentage may be predefined, for example, by defining a rate at which there is a 90% certainty that a data block will be delivered by the switch.

At S430, a client specific buffer is initiated with the targeted NAS device. The client-specific buffer is associated with a client device, for example by associating the buffer with an identifier of the client device, such as an alphanumeric ID, MAC address, IP address, and the like. The buffer may be initiated by the client device, by the NAS device, by a switch, or a combination thereof.

At S440, at least one second request is sent to the NAS device. The second request is a request which the client device indicates should be stored in the client-specific buffer. In some embodiments, the second request may be stored on a queue, implemented on a memory communicatively coupled with the NAS device, on the NAS device itself, on a second NAS device communicatively coupled with the NAS device, on a switch, combinations thereof and the like. In certain embodiments, the NAS device may retrieve the data block referred to by the request (locally on the NAS device, or from another NAS device) and store the data block in the client specific buffer.

At S450, a retrieval request to retrieve data from the client specific buffer is sent. A check may be performed periodically, to determine if the egress buffer is free. The time period may be adaptive, dynamic or static. In response to the check, the client device may send the request to retrieve data from the client-specific buffer, until such data is retrieved. The data block may be sent from the client-specific buffer to the egress buffer, to be sent to the requesting client device.

At S460, a check is performed to determine if additional data should be requested from a storage device. If so, execution continues at S410, or in some embodiments S450. Otherwise, execution terminates.

In some embodiments, the client-specific buffer may be shared by a plurality of client devices. In such embodiments, each client may be assigned a priority to determine which traffic should be handled first. In other embodiments, traffic may be handled on a first come first served basis. In yet other embodiments, a combination thereof may be implemented.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for improving network storage accessibility, the method comprising:
    sending at least a first request for a data block to be sent from a storage device to a client device over a network connection;
    determining if the network is congested;
    initiating a client-specific buffer when it is determined that the network is congested, wherein the requested data block is stored in the client-specific buffer; and
    sending at least a second request for the data block stored within the client-specific buffer to be sent to the client device.

2. The method of claim 1, wherein the client-specific buffer is initiated within at least one of: the storage device and a switch.

3. The method of claim 1, wherein the data block is sent to the client device via a switch that includes a first memory buffer for ingress network traffic and a second memory buffer for egress network traffic.

4. The method of claim 3, wherein determining if the network is congested further comprises:
    determining that the first memory buffer or the second memory buffer is full.

5. The method of claim 4, wherein determining that the first memory buffer or the second memory buffer further comprises:
    determining a rate at which the client device sends requests for data.

6. The method of claim 1, wherein determining if the network is congested further comprises:
determining a growth in network response times as exceeding a predetermined threshold.

7. The method of claim 1, wherein the client specific buffer is initiated by at least one of: the client device, the storage device, and a switch.

8. The method of claim 1, wherein the client specific buffer is shared by a plurality of client devices.

9. The method of claim 1, wherein a client device has one or more client-specific buffers.

10. A non-transitory computer readable medium having stored thereon instructions for causing a processing circuitry to perform a process, the process comprising:
sending at least a first request for a data block to be sent from a storage device to a client device over a network connection;
determining if the network is congested;
initiating a client-specific buffer when it is determined that the network is congested, wherein the requested data block is stored in the client-specific buffer; and
sending at least a second request for the data block stored within the client-specific buffer to be sent to the client device.

11. A system for improving network storage accessibility, comprising:
a processing circuitry; and
a memory, the memory containing instructions that, when executed by the processing circuitry, configure the system to:
send at least a first request for a data block to be sent from a storage device to a client device over a network connection;
determine if the network is congested;
initiate a client-specific buffer when it is determined that the network is congested, wherein the requested data block is stored in the client-specific buffer; and
send at least a second request for the data block stored within the client-specific buffer to be sent to the client device.

12. The system of claim 11, wherein the client-specific buffer is initiated within at least one of: the storage device and a switch.

13. The system of claim 11, wherein the data block is sent to the client device via a switch that includes a first memory buffer for ingress network traffic and a second memory buffer for egress network traffic.

14. The system of claim 13, wherein the system if further configured to:
determine that the first memory buffer or the second memory buffer is full.

15. The system of claim 14, wherein the system if further configured to:
determine a rate at which the client device sends requests for data.

16. The system of claim 11, wherein the system if further configured to:
determine a growth in network response times as exceeding a predetermined threshold.

17. The system of claim 11, wherein the client specific buffer is initiated by at least one of: the client device, the storage device, and a switch.

18. The system of claim 11, wherein the client specific buffer is shared by a plurality of client devices.

19. The system of claim 11, wherein a client device has one or more client-specific buffers.

* * * * *